United States Patent [19]
Moe

[11] 3,813,918
[45] June 4, 1974

[54] METHODS AND APPARATUS USING MICROWAVES FOR MATERIAL CHARACTERISTICS MEASUREMENTS

[75] Inventor: Lowell A. Moe, St. Paul, Minn.
[73] Assignee: Ramex Company, Saint Paul, Minn.
[22] Filed: Dec. 23, 1971
[21] Appl. No.: 211,269

[52] U.S. Cl. .................. 73/15 B, 73/76, 219/10.55
[51] Int. Cl. ............................................ G01n 5/04
[58] Field of Search .................. 73/76, 15 B, 15.4; 219/10.55; 324/58.5 R, 58.5 C

[56] References Cited
UNITED STATES PATENTS

| | | | |
|---|---|---|---|
| 3,365,562 | 1/1968 | Jeppson | 219/10.55 |
| 3,477,274 | 11/1969 | Wald et al. | 73/15 B |
| 3,500,012 | 3/1970 | Hilton | 219/10.55 X |
| 3,526,737 | 9/1970 | Black | 219/10.55 |
| 3,673,852 | 7/1972 | Davis | 73/15.4 |

FOREIGN PATENTS OR APPLICATIONS

| | | | |
|---|---|---|---|
| 23,956 | 12/1965 | Japan | 73/76 |

Primary Examiner—James J. Gill
Attorney, Agent, or Firm—Alberts, Brezina & Lund

[57] ABSTRACT

Methods and apparatus for measurement of the characteristics of materials wherein a sample of material is placed in an enclosed chamber supplied with microwave energy to volatilize an ingredient, such as moisture, in the sample. The content of the volatized ingredient is determined by measurement of the weight change, preferably with the weight being measured while the sample is within the chamber, immediately after application of the microwave energy. Dielectric absorption properties of the material are determined by microwave field measurements, preferably performed after moisture removal and before volatization of other ingredients. Important features relate to the coupling of a tray within the chamber to a weighing mechanism outside the chamber, to the use of a microwave stirrer and stopping of the stirrer at a certain position to permit accurate measurements, and to monitoring of the microwave field to control cut-off of the microwave energy and for other purposes.

7 Claims, 7 Drawing Figures

INVENTOR
LOWELL A. MOE
BY Alberts, Brezina & Lund
ATTORNEYS

INVENTOR
LOWELL A. MOE
BY Alberts, Brezina & Lund
ATTORNEYS

INVENTOR
LOWELL A. MOE
BY Alberts, Brezina + Lund
ATTORNEYS

METHODS AND APPARATUS USING MICROWAVES FOR MATERIAL CHARACTERISTICS MEASUREMENTS

This invention relates to methods and apparatus using microwaves for material characteristics measurements and more particularly to method and apparatus by which moisture content and quickly absorption characteristics of a sample can be readily and qickly measured with a high degree of accuracy, reliability and safety. The methods and apparatus of the invention are versatile and applicable to a wide variety of materials.

Moisture content has heretofore been measured by drying out a sample of a material, the weight of the sample being measured before and after the drying operation. When a conventional oven is used for drying, an excessively high temperature can result in damage, as by volatization of ingredients other than water. When such damage is encountered, the temperature may be reduced to a lower value or the sample must be ground to a small granular size, if the material is such as to permit grinding. In many cases, both must be done. For example, in the case of grain and cereal products, one procedure is to grind the sample to a 20 mesh particle size and then place it in an oven at a temperature of 138° C for a period of 1 hour. In the case of coal, a smaple may be ground down to a 200 mesh size, dried 12 hours at room temperature and then placed in an air oven for another 12 hours at a temperature of about 110° F. The prior art methods generally require that after heating, the sample must be placed in a desiccator to cool before weighing, since otherwise the ingredients of the sample will recombine with moisture in the air.

Such prior methods require a large amount of time for each moisture determination and are subject to a number of inaccuracies. For example, in the grinding operation, heat is generated, removing some moisture, and an empirical error is imposed.

This invention was evolved with the general object of overcoming the disadvantages of prior art methods and apparatus and of providing methods and apparatus with which the moisture content of a sample can be readily and quickly measured with a high degree of accuracy and reliability. Another object of the invention is to provide methods and apparatus by which dielectric absorption properties of a material can be accurately measured.

A further object of the invention is to provide methods and apparatus which are highly versatile and applicable to a wide variety of materials.

In accordance with this invention, a sample of a material is placed in an enclosed chamber which is coupled to a source of microwave energy. Microwave energy has the very important advantage of rapid heating. In the case of analyzing moisture content of flour, conventional methods generally require 1 hour and 10 minutes to bake out a 10 gram sample. With microwave energy, 100 grams can be analyzed in about 4 minutes. For sausage, conventional methods require 4 hours or more to remove moisture, but with microwaves, moisture can be removed in 7 minutes and in only 3 minutes in the case of drier sausages such as baloney. The microwave energy generates heat within the molecules of the sample, which attempt to align themselves with the polarity of the electromagnetic field, changed at an extremely rapid rate, (2,540,000,000 times per second, for example). The high frequency oscillations of the molecules produce heat within all portions of the sample. The sample is not heated from the outside in, as in conventional ovens nor is it heated from the inside out. The sample is heated uniformly throughout.

It is found that in addition to the savings in time, a number of other very important advantages result. Unlike conventional methods, heating by microwaves does not depend upon the ability of the sample to conduct heat and the methods of this invention can be applied to materials having low heat conductivity. Also, since the material is heated uniformly, limitations of the material with respect to surface characteristics have little effect. For example, milk is a good heat conductor but can be easily scorched if its surface is overheated and with conventional methods must be heated very slowly, whereas with microwave energy, milk can be rapidly heated without scorching.

The invention can thus be applied to a wide variety of materials, including dairy products, dry milk, ceramics, ready mix cement, transistors and semi-conductors, inks, paints, grains, flour and meats, as but a few examples.

A further important advantage of the uniform heating is that grinding or other preparation of the sample is either not required or is reduced to a minimum, and the errors of conventional methods are obviated, while also saving the expenditure of time required for such preparation steps.

Very important features of the invention relate to the performance of measurements of characteristics of the sample, while it is in the microwave cavity or chamber, and without requiring removal therefrom. In accordance with this invention, the sample is weighed in the same environment in which it is heated, eliminating the time-consuming desiccator step and avoiding problems in connection with recombining of the material of the sample with moisture in the air.

To weigh the sample, it is supported within the chamber on a tray which is preferably connected to a weighing mechanism outside the chamber. Most preferably, and in accordance with a specific feature of the invention, the tray is suspended from a balance beam of an analytical balance mounted on a top wall of the chamber, preferably with the suspension being through a filament of plastic or other dielectric material. The filament extends through a cavity gland including a metal sleeve having a length so related to the frequency of the microwave energy as to form a tuned wave guide section which prevents transmission of the microwave energy to the outside of the chamber. The gland also includes a ring of energy absorbing material at the upper end thereof, for further absorption and suppression of the energy, especially harmonic frequency components, thereof. With this arrangement, the sample can be readily weighed while in the chamber and at the same time, the arrangement is safe in operation, no microwave energy being transmitted to the outside of the chamber.

Additional features of the invention relate to monitoring of the microwave field, for a number of important purposes, one of which is to provide optimum control of the amount of microwave energy applied. It has been found that microwave energy has selective heating properties and that the energy when first applied will generally concentrate in one ingredient of a sample until it is volatilized, oxidized or otherwise changed until the microwave energy no longer has appreciable effect thereon. Thereafter, it may concentrate in one or more additional ingredients. In the case of samples of moisture-containing materials, the energy when first applied is generally concentrated in the moisture, producing volatilization at a rapid rate, the rate decreasing with time. When substantially all of the moisture is removed, the intensity of the microwave field, measured at a suitable monitoring point, levels off. If the supply of microwave energy is continued, volatilization or other changes of a second ingredient may be obtained. For example, in the case of the sausage, volatilization of the fat content may be effected. If the supply is thereafter continued changes in other ingredients may be effected, in many cases by oxidation or burning of the material.

When measuring moisture content, it is important that the supply of energy be discontinued during the time period in which the field intensity initially levels off and before appreciable changes in the weight of other ingredients takes place. Thus monitoring of the field intensity permits accurate determination of moisture content.

Monitoring of the microwave field intensity is also advantageous in that it permits determination of dielectric absorption properties of the material of the sample, and an important determination in many applications. In some cases, it is desirable to determine the dielectric absorption properties after removal of one ingredient, such as the moisture ingredient. In accordance with this invention, methods and apparatus are provided for determining dielectric absorption properties, both before and after removal of an ingredient.

A specific feature of the invention relates to the use of a microwave stirrer in a manner such as to obtain uniformity in the application of microwave energy to the sample while at the same time permitting accurate measurement of field intensity. In accordance with this feature, the stirrer is stopped at a predetermined position, when dielectric absorption properties are to be determined, to permit accurate calibration and accurate determination of the dielectric absorption properties.

This invention contemplates other objects, features and advantages which will become more fully apparent from the following detailed description taken in conjunction with the accompanying drawings which illustrate a preferred embodiment and in which.

Figure 1:
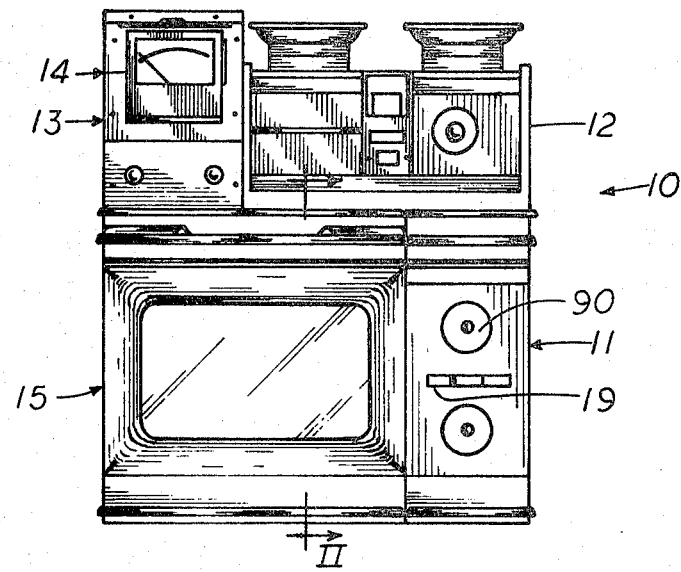
FIG. 1 is a front elevational view of measuring apparatus according to the principles of the invention.
Figure 2:
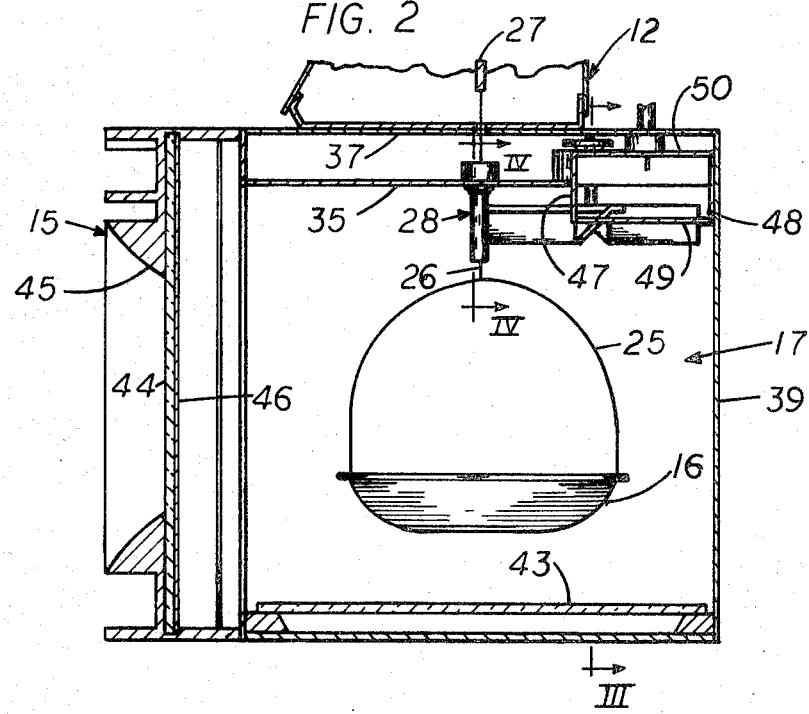
FIG. 2 is a sectional view, on an enlarged scale, taken substantially along line II—II of FIG. 1.
Figure 3:
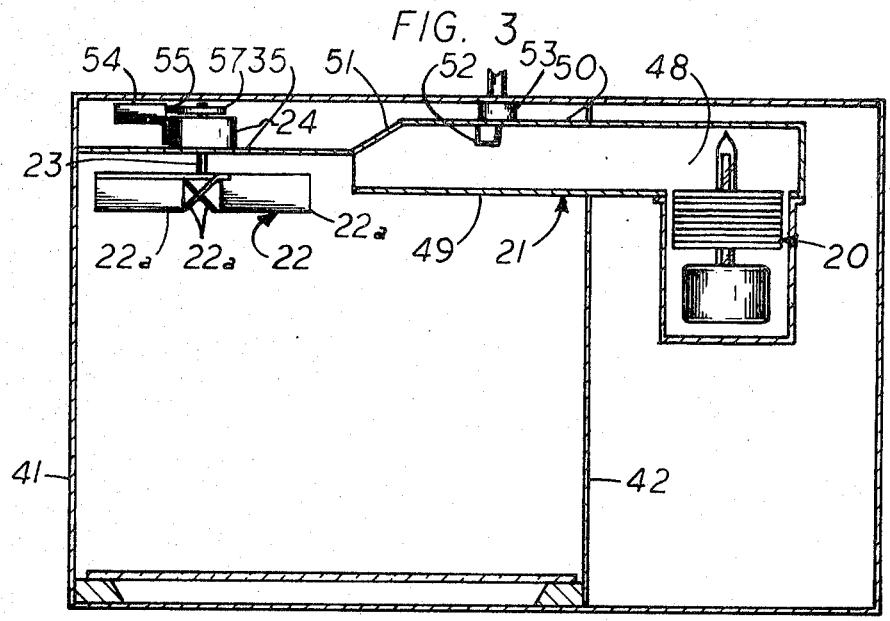
FIG. 3 is a sectional view taken substantially along line III—III of FIG. 2.
Figure 4:
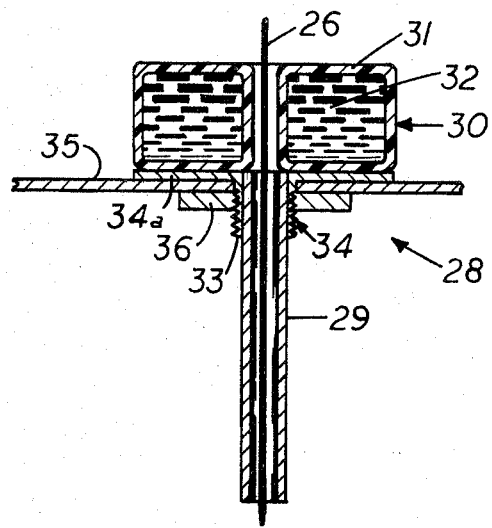
FIG. 4 is a sectional view, on an enlarged scale taken substantially along line IV—IV of FIG. 2 and illustrating a cavity gland according to the invention.

Reference numeral 10 generally designates apparatus constructed in accordance with the principles of this invention and comprising a microwave oven 11, an analytical balance unit or weighing mechanism 12 and a product determination unit 13 which includes a dielectric absorption meter 14 and also electronic circuitry for product volatilization control as hereinafter described. The apparatus 10 is usable for a number of purposes including determination of moisture content and the measurement of dielectric absorption properties and can be used both as a laboratory instrument for research and product evaluation and as a production line instrument for monitoring "onstream" in manufacturing and in material processing systems.

In using the apparatus 10, a hinged door 15 of the oven 11 is opened and a sample of material is placed in a tray 16 within a heating chamber 17 of the oven. Tray 16 is of a suitable plastic or other low gloss dielectric material while the walls of the chamber 17 are of metal to reflect and not absorb microwave energy.

After closing the door 15, a start button 19 is depressed to energize a voltage supply for a magnetron 20 and to cause microwave energy to be supplied through a wave guide section 21 and from a microwave stirrer 22 into the chamber 17. The stirrer 22 is secured to a shaft 23 of an electric motor 24 and includes a plurality of radially extending blades 22a which serve to reflect the energy into the chamber 17 in continually changing directions, in a manner such as to obtain uniform distribution of the energy.

In accordance with an important feature, the instrument is so designed as to readily permit weighing with the mechanism 12 outside the chamber while the sample is within the chamber. In particular, a hangar 25 for the tray 17 is connected through a filament 26, preferably of teflon or other dielectric material, to a balance beam 27 of the mechanism 12, which is of a known type, such that the weight can be measured with high accuracy to take advantage of the unique properties of the microave heating. The construction of the weighing mechanism, except for the connection to the tray 16, is known in the art and it is therefore not illustrated in detail.

In accordance with the invention, the sample is weighted while it is within the chamber 17, immediately after the removal of moisture and without requiring any cooling step, simplifying and speeding up the procedure and perhaps more important, insuring against any recombination of the sample ingredients with moisture of ambient air, so as to reliably obtain an extremely high degree of accuracy.

A specific feature is in the provision of a special unit 28, referred to herein as a cavity gland, which permits the connection of the tray 16 to the external weighing mechanism 12 while obviating radiation of the microwave energy to the outside of the chamber 17 and thus insuring safety in operation. The cavity gland 28 comprises a vertical metal cylindrical tube 29 through which the filament 26 extends and having dimensions such as to be tuned beyond cut-off at the operating frequency of the magnetron 20. By way of example, the tube 29 may have a length of approximately 3 inches and an internal diameter of five-sixteenths when the frequency of operation is 2,450 MHz. The tube 29 alone effectively suppresses energy at the operating frequency. It is found that the magnetron 20 may generate some energy at harmonic frequencies and to suppress such energy, as well as to further insure suppression of energy at the operating frequency, an energy absorpent ring 30 is provided at the upper end of the tube 29. The illustrated ring 30 is in the form of a hollow annulus of plastic or the like, filled with a liquid 32 such as glycerine or water which is highly absorptive of energy and microwave frequencies. It will be appreciated that other liquids or solid materials of highly absorptive properties may be used.

In the illustrated arrangement, the end of the tube 29 is secured within a sleeve portion 33 of a fitting 34 having a flange portion 34a, which supports the ring 30 and which rests on a plate 35 forming the top wall of the chamber 17, with a nut 36 being threaded on the sleeve portion 33. Plate 35 is an inner wall of the oven, being located in spaced relation below a top wall 37 on which the weighing mechanism is supported. If desired, the tube 29 could be supported from the top wall 37, with a length sufficient to extend downwardly through the plate 35, without significant effect on the operation.

It is here noted that to define the chamber 17, the oven 11 additionally includes a rear wall 39, a bottom wall 40 and side walls 41 and 42. A plate 43 of glass or other ceramic material is supported is spaced relation above the bottom wall 40 for supporting samples in measurements in which weighing is not desired. The door 15 includes a glass plate 44 behind an opening 45 and a metal plate 46 behind the glass plate 44. Plate 46 is perforated to allow observation of the interior of the chamber, the perforations being very small to prevent propagation of the microwave energy therethrough, while the spacing therebetween is small enough to permit visibility. Suitable microwave sealing means are provided around the periphery of the door 15.

The wave guide section 21 includes side walls 47 and 48, a bottom wall 49 and a top wall 50, the top wall 50 being above wall 35 and having a terminal end portion 51 angled downwardly to the level of the wall 35.

To sense the field in the wave guide section 21, a probe is provided in the form of an inductive loop 52 extending downwardly from the top wall 50, one end of the loop 52 being connected to the top wall 50 adjacent the periphery of an opening therein with the other end thereof being connected to a center conductor within a coaxial line fitting 53. Loop 52 is arranged a small portion of the forwardly flying current in the guide 21, the current being converted to direct current and applied to the meter 14, as hereinafter described.

Figure 5:
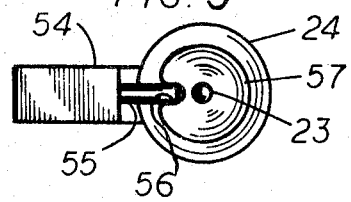
FIG. 5 is a top plan view, on an enlarged scale, illustrating a detent stop arrangement according to the invention.

Another feature of the invention is in the provision of means for stopping the stirrer 22 in a predetermined position, for the purpose of insuring a highly accurate measurement. If the stirrer 22 is rotating, the microwave field varies during rotation and although integration can be performed to obtain a measurement of the average field, it is found to be prefeable for higher accuracy to be able to make the measurement with the stirrer in a predetermined position. To stop the stirrer 22 in a certain position, a solenoid 54 is mounted on the housing of the motor 24 and includes a plunger 55 urged by an internal spring (not shown) to a position as illustrated in FIG. 5, in which one end thereof engages in a notch 56 in a disc 57 affixed to the upper end of the motor shaft 23. Solenoid 54 is energized when the motor 24 is energized to retract the plunger 55 and to allow rotation of the motor shaft 23 and stirrer 22. When the motor 24 and the solenoid 54 are de-energized, the plunger is actuated by the internal spring to move into the notch 56 and to lock the shaft 23 and thereby the stirrer 22 in a predetermined angular position, preferably such that a minimum amount of microwave energy is reflected back from the stirrer 22 into the wave guide section 21.

Figure 6:
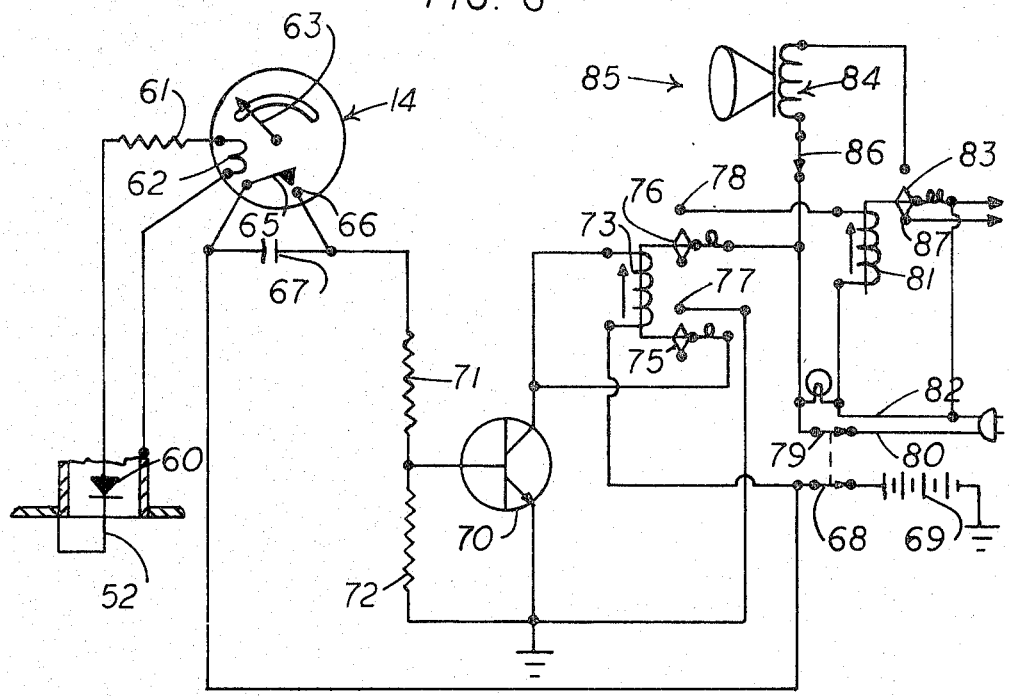
FIG. 6 is a schematic diagram of electrical circuitry of the apparatus.

The electrical circuitry for the system is shown in FIG. 6. The loop 52 is coupled through a diode 60 and a resistor 61 to a deflection coil 62 of the meter 14 which has a pointer 63, as diagrammatically indicated. Diode 60 is operative to convert current at the frequency of the microwave energy to direct current which is applied through the resistor 61 to the coil 62 to move the pointer 63 in proportion to the current, and thereby in proportion to the forward flowing current in the wave guide section 21. The meter 14 thus provides an indication of the power absorbed by the sample.

Through a suitable mechanical arrangement of a type known in the art, a switch contact 65 engages with another switch contact 66 when the pointer is at a certain position, which position is manually adjustable.

A capacitor 67 is connected between the contacts 65 and 66. Contact 65 is connected to an on-off switch contact 68 to the positive terminal of a battery 69 having its negative terminal connected to ground. The base of a transistor 70, preferably operated as a Darlington amplifier, is connected through a resistor 71 to contact 66 and through a resistor 72 to ground. The emitter of transistor 70 is connected to ground while the collector thereof is connected through a relay coil 73 and through the contact 68 to the positive terminal of the battery 69.

In operation of the circuit as thus far described, transistor 70 is non-conductive when the contacts 65 and 66 are disengaged. When the contacts are engaged, transistor 70 is conductive and the current therethrough passes through the coil 73 to move a pair of contacts 75 and 76 into engagement with fixed contacts 77 and 78. Contacts 75 and 77 are connected to the collector and emitter electrodes of transistor 70 and, when engaged, maintain current flow through the coil 77. Contact 76 is connected through an off-on switch contact 79 to a supply line 80 while contact 78 is connected through a relay coil 81 to a second supply line 82, relay coil 81 being thus energized when relay coil 73 is energized. With coil 81 energized, a contact 83, connected to the supply line 82, is connected through a coil 84 of a buzzer 85, or other sounding or signal device, a switch 86 and the on-off switch 79 to the supply line 80. Contact 83 in the de-energized condition of the relay coil 81 is engaged with a contact 87, contacts 83 and 87 being connected to a control circuit for the magnetron voltage supply, the magnetron being operated when the contacts 83 and 87 are engaged and being de-energized when such contacts are disengaged.

Figure 7:
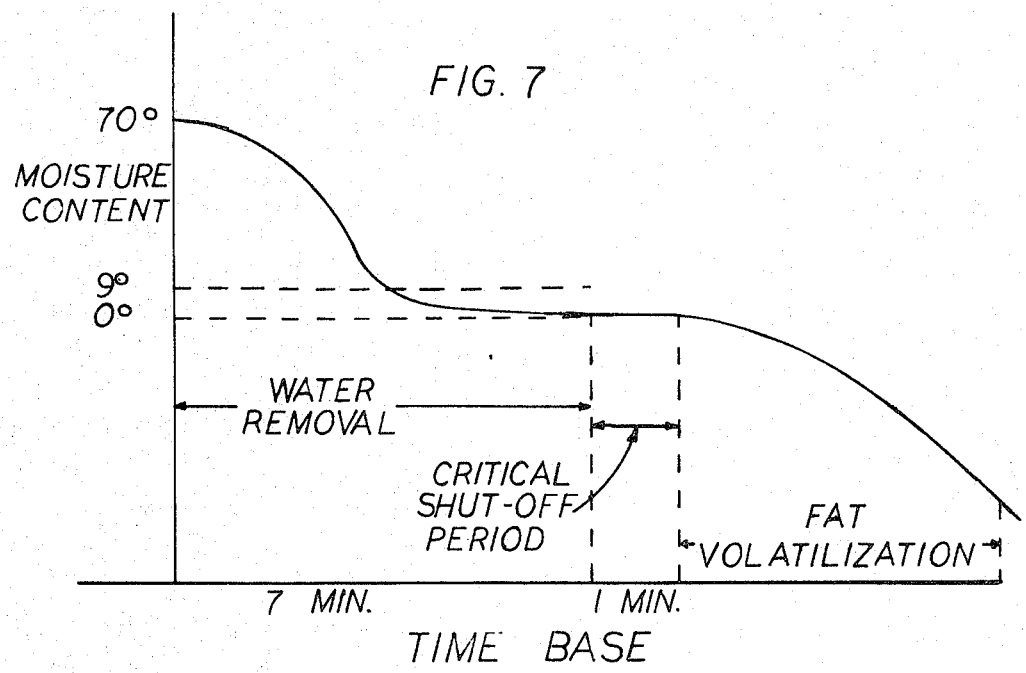
FIG. 7 is a graph illustrating the change of microwave field intensity with time during operation of the apparatus.

Before reviewing the overall operation of the circuitry, the graph of FIG. 7 should be considered. This graph illustrates the change in weight of a sample, such as a meat product, containing moisture and fat, during continuous application of microwave energy. Initially, the sample has a certain moisture content (70 percent in the example) and as the microwave energy is applied, the moisture content drops at a relatively rapid rate until only a small portion remains (9 per cent in the example) and then drops at a slower rate until all of the moisture is removed, at an elapsed time of 7 minutes in the example. The weight then remains stable for a substantial amount of time, 1 minute in the example, during which the sample heats up and then fats start to volatilize, the rate of volatization of the fats being increased with additional exposure. It is very important to not that during the removal of the moisture, substantially no fat is volatilized, because the microwave energy concentrates in the moisture ingredient as long as it is present. The fats start to volatilize only after removal of the moisture and after further heating of the sample. By contrast, in the conventional oven drying procedure, where the heat is applied from the outside, both moisture and fats are volatilized throughout the heating process. Thus, an accurate determination of either water content or fat content is not possible.

In operating the illustrated system to determine moisture content, the door 15 is opened and a sample of material is placed on the tray 16 within the chamber, the weight of the sample being determined either before it is placed on the tray 16, or after it is placed on the tray 16, using the weighing mechanism 12. The door 15 is then closed and the button 19 is depressed, energizing the magnetron 20, the stirrer motor 24 and the solenoid 54. Initially, the meter 14 will register a high value, the forward flowing current in the wave guide section 21 being at a maximum, and as the moisture is volatilized in the sample, the meter reading will reduce. When all of the moisture is removed, the meter current will stabilize at a certain value due to the effects explained in connection with FIG. 7.

With the circuitry of FIG. 6 operable, i.e., with switch contacts 68, 79 closed and with switch contacts 65, 66 set to engage at said certain value, such engagement of the contacts 65, 66 will cause the transistor 70 to conduct, energizing the relay coil 73 and thence the relay coil 81. With relay coil 81 energized and with switch 86 closed, the buzzer 85 sounds and simultaneously, the magnetron 20 will be turned off through the lines connected to contacts 83 and 87. The operator can then open the switch 86 to turn off the buzzer 85 and can then weigh the sample and determine the percentage moisture content, using the weighing mechanism 12.

To determine the dielectric absorption properties of the sample, switch contact 68, 79 can be opened and the magnetron can be energized while the stirrer motor 24 and solenoid 54 are energized by opening suitable switch, not shown. The reading of the meter 14 then provides an accurate indication of the dielectric absorption properties and it is noted that the meter 14 is preferably designed to accommodate removable and selectively usable dial scales calibrated according to various types of materials. It is also noted that the dielectric absorption properties can be measured at any point in the operation, before application of the microwave energy (except as required to make the measurement) or after application of the microwave energy for any desired length of time. A suitable timer, controlled by a dial 90 is provided for operating the magnetron for a selected time interval. The apparatus is thus very versatile and can be used in many types of laboratory and research projects.

It will be understood that modifications and variations may be effected without departing from the spirit and scope of the novel concepts of this invention.

I claim as my invention:

1. In a method of determining the characteristics of a material containing a volatile ingredient, the steps of providing an enclosed chamber and a source of microwave energy coupled to said chamber, placing a sample of said material in said chamber, supplying microwave energy from said source into said chamber to generate heat within said sample and to volatilize an ingredient of said sample while establishing at a certain point a microwave field which varies in strength as a function of the degree of the volatilization of said ingredient of the sample, and monitoring the microwave field strength at said certain point to continuously measure the degree of volatilization of said ingredient of the sample.

2. In a method as defined in claim 1, wherein the material is such that the strength of said field at said certain point levels off when said ingredient of the sample is substantially volatilized, determining the content of said ingredient by measuring the difference between the weight of the sample prior to heating thereof and the weight of the sample after the strength of said field at said certain point levels off.

3. In a method as defined in claim 2, said ingredient of said sample being the moisture therein.

4. In a method as defined in claim 2, placing said sample on a platform within said chamber connected to weighing means outside said chamber, and performing said weight difference measurement with said weighing means.

5. In apparatus for determining characteristics of a material containing volatile ingredients, metal wall means defining an enclosed chamber for receiving a sample of said material, a source of microwave energy, wave guide means for supplying microwave energy from said source to said chamber to generate heat within said sample and to volatilize an ingredient of the sample while establishing at a certain point a microwave field which varies in strength as a function of the degree of volatilization of said ingredient of the sample, probe means at said certain point for developing a signal proportional to the microwave field thereat, monitoring means for monitoring the amplitude of said signal, microwave stirrer means for directing microwave energy from said wave guide means into said chamber at continually varying directions, and means for stopping said stirrer means at a certain position to provide a uniform condition permitting accurate measurement of said microwave field.

6. In apparatus for determining characteristics of a material containing volatile ingredients, metal wall means defining an enclosed chamber for receiving a sample of said material, a source of microwave energy, wave guide means for supplying microwave energy from said source to said chamber to generate heat within said sample and to volatilize an ingredient of the sample, weight measuring means for measuring the weight of said sample prior to and after heating thereof to determine the contents of the volatilized ingredient, said weight measuring means comprising a platform within said chamber and a weighing mechanism outside said chamber coupled to said platform, said metal wall means having an opening therethrough, an elongated member of dielectric material coupling said platform to said weighing mechanism, and gland means at said opening surrounding said elongated member of dielectric material and arranged for minimizing transmission of microwave energy from within said chamber and out through said opening to the surrounding space, said gland means comprising a metal tube surrounding said elongated member and mounted in and extending inwardly through said metal wall means, said tube having a length and cross-sectional dimensions such as to be tuned beyond cut-off at the frequency of said microwave energy, and a hollow annulus of plastic material extending outwardly from the outer end of said tube in concentric relation thereto and in surrounding concentric relation to said elongated member of dielectric material, and a liquid filling said hollow annulus and having high microwave absorptive characteristics.

7. In apparatus for determining characteristics of a material containing volatile ingredients, metal wall means defining an enclosed chamber for receiving a sample of said material, a source of microwave energy, wave guide means for supplying microwave energy from said source to said chamber to generate heat within said sample and to volatilize an ingredient of the sample while establishing at a certain point a microwave field which varies in strength as a function of the degree of volatilization of said ingredient of the sample, probe means at said certain point for developing a signal proportional to the microwave field thereat, said probe means being mounted in said wave guide means and being arranged for measuring the forward flowing current in said wave guide means, monitoring means including meter means for indicating the amplitude of said forward flowing current and for establishing a value at which the amplitude of said forward flowing current levels off for a substantial time interval following complete volatilization of said one ingredient and prior to volatilization of other ingredients, means associated with said meter means and arranged to be manually set to develop an output signal when said forward pulling current levels off at said certain value, signal means operable in response to said output signal, and means responsive to said output signal for disabling said source of microwave energy.

* * * * *